United States Patent
Heinzelmann et al.

(10) Patent No.: US 7,032,438 B2
(45) Date of Patent: Apr. 25, 2006

(54) PRESSURE GAUGE GLOW PLUG

(75) Inventors: Stefan Heinzelmann, Talheim (DE);
Frank Pechhold, Ludwigsburg (DE);
Arno Marto, Weil der Stadt (DE)

(73) Assignee: Beru AG, Ludwigsburg (DE)

( * ) Notice: Subject to any disclaimer, the term of this patent is extended or adjusted under 35 U.S.C. 154(b) by 0 days.

(21) Appl. No.: 11/128,222

(22) Filed: May 13, 2005

(65) Prior Publication Data
US 2005/0252297 A1    Nov. 17, 2005

(30) Foreign Application Priority Data
May 17, 2004    (DE) ...................... 10 2004 024 341

(51) Int. Cl.
*G01L 3/26*    (2006.01)

(52) U.S. Cl. ........................................................ 73/115
(58) Field of Classification Search ............... 73/35.01, 73/35.06, 35.07, 35.12, 35.13, 112, 115, 116, 73/117.2, 117.3, 119 R, 708; 340/438, 439
See application file for complete search history.

(56) References Cited

U.S. PATENT DOCUMENTS

| | | | |
|---|---|---|---|
| 4,494,401 A * | 1/1985 | Dobler et al. | 73/35.12 |
| 4,549,430 A * | 10/1985 | Dobler et al. | 73/115 |
| 6,539,787 B1 | 4/2003 | Murai et al. | 73/119 R |

FOREIGN PATENT DOCUMENTS

| | | |
|---|---|---|
| DE | 196 80 912 T1 | 10/1997 |
| EP | 1 134 385 A2 | 9/2001 |

* cited by examiner

*Primary Examiner*—William Oen
(74) *Attorney, Agent, or Firm*—David S. Safran

(57) ABSTRACT

A pressure gauge glow plug for a diesel engine having a plug body, a heating element, and a pressure sensor, which is positioned under pretension between the heating element and the plug body in such a way that the pressure sensor experiences the pressure existing in the combustion chamber of the cylinder in which it is inserted. The heating element is positioned so that it may be slid in an axial direction in the plug body and transmits the pressure in the combustion chamber of the cylinder to the pressure sensor. The pressure sensor is positioned on a heating element support that is permanently bonded to the heating element in a cap that permanently bonded to the plug body. The heating element support and pressure sensor form a unit that has axial play in the interior of the cap.

6 Claims, 2 Drawing Sheets

PRESSURE GAUGE GLOW PLUG

BACKGROUND OF THE INVENTION

1. Field of Invention

The present invention relates to a pressure gauge glow plug for a diesel engine having a plug body for insertion into a cylinder of the diesel engine, a heating element which is positioned in the plug body, and a pressure sensor, which is positioned, under pretension, between the heating element and the plug body in such a way that the pressure sensor experiences the pressure existing in the combustion chamber of the cylinder, which is transmitted from the heating element.

2. Description of Related Art

A pressure gauge glow plug of this type is known from European Patent Application EP 1 096 141 A3 and corresponding U.S. Pat. No. 6,539,787.

In this known pressure gauge glow plug, the plug body and the heating element are rigidly bonded to one another on the combustion chamber side and the plug body has such a strength that it may radially deform elastically when a pressure is applied to it. The pressure in the combustion chamber of the cylinder acts on the plug body and the heating element, so that the plug body, which is seated solidly in the cylinder of the internal combustion engine, deforms elastically while the heating element moves axially in relation to the plug body. Through this axial motion in relation to the plug body, the pressure sensor, which is under pretension, is unloaded, the difference in the load state between the loaded and the unloaded state being tapped as the signal for the pressure existing in the combustion chamber and analyzed.

The purpose of a pressure gauge glow plug of this type is to act as a cold-start aid for starting the diesel engine at low temperatures and/or for intermediate glowing in the event of unfavorable operating conditions and, in addition, to obtain information about the combustion sequence in the cylinder through the pressure sensor, which may comprise a piezoceramic or a strain gauge, to analyze this information, and to control the combustion sequence accordingly. By using a pressure gauge glow plug of this type, a diesel engine results which may be regulated in regard to the reduction of exhaust gases and consumption.

In a pressure gauge glow plug of this type, not only is the pressure produced in the cylinder relayed via the heating element to the pressure sensor, but also mechanical forces caused by temperature oscillations or thermal loads of the glow plug caused by glowing, by ambient temperature oscillations, etc. are also relayed to the pressure sensor, which then changes its properties, particularly its pretension, which may result in measurement errors.

SUMMARY OF THE INVENTION

A primary object of the present invention is to provide a pressure gauge glow plug of the type cited at the beginning in which mechanical temperature compensation of the sensor is possible.

The pressure gauge glow plug according to the present invention is particularly to be implemented in such a way that no noticeable pressure is exerted on the pressure sensor by a breakaway torque, by thermal oscillations, or by mechanical vibrations.

This object is achieved according to the present invention in that the pressure sensor is positioned on a support bonded rigidly to the heating element in the interior of a cap bonded rigidly to the plug body in such a way that the system comprising support and sensor has axial play in the interior of the cap.

In the following, especially preferred exemplary embodiments of the present invention will be described in greater detail on the basis of the accompanying drawings.

DETAILED DESCRIPTION OF THE INVENTION

Figure 1:
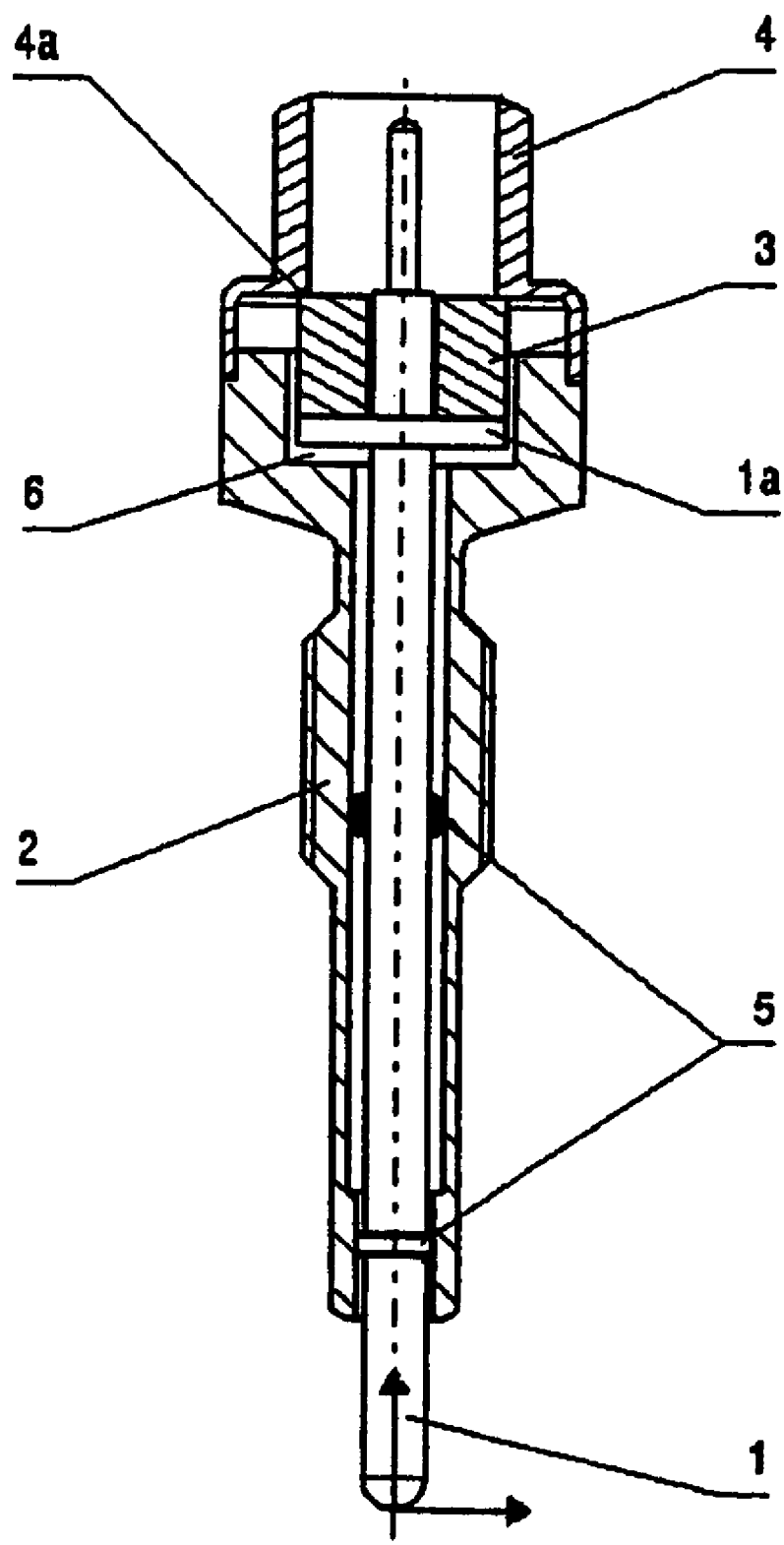
FIG. 1 is a sectional view an exemplary embodiment and
FIG. 2 is a sectional view of another exemplary embodiment.

The exemplary embodiment of the pressure gauge glow plug according to the present invention shown in FIG. 1 has a plug body or housing 2, in which a heating element 1 is positioned so that it projects, on the combustion chamber side, from the plug body 2. The plug body 2 is designed for inserted into a cylinder of a diesel engine.

A pressure sensor 3 is positioned under pretension between the heating element 1 and the plug body 2 in such a way that the pressure sensor 3 experiences the pressure existing in the combustion chamber of the cylinder in which it has been inserted. For this purpose, the heating element 1 is positioned so that it may be displaced by sliding in the axial direction in the plug element 2, so that it transmits the pressure in the combustion chamber of the cylinder to the pressure sensor 3.

As is illustrated in detail in FIG. 1, the pressure sensor 3 is positioned on a heating element support 1a, which is fixedly bonded to the heating element 1. The system comprising pressure sensor 3 and heating element support 1a is positioned in the interior of a cap 4, which has an axial height 4a and is fixedly bonded to the plug element 2, for example, by welding. The inner surface of the top of the cap 4 forms a fixed point on which the pressure sensor 3 is pressed by the movably positioned heating element 1 when the pressure produced in the cylinder is relayed via the heating element 1 and the heating element support 1a to the pressure sensor 3.

If thermal loads are applied to the glow plug by glowing, ambient temperature oscillations, etc., different pretensions arise at the pressure sensor 3 because of the different thermal expansion coefficients of the components, and therefore, measurement errors of the pressure sensor 3 occur.

As shown in FIG. 1, a compensation gap 6 is provided below the heating element support 1a for temperature compensation, i.e., the axial height 4a of the interior of the cap 4 is designed in such a way that it is greater than the axial height of the system comprising pressure sensor 3 and heating element support 1a. This compensation gap 6 allows expansions as a result of different thermal expansion coefficients of the pressure sensor 3, the cap 4, and/or the plug housing 2 and the heating element support 1a to be compensated for.

While in the exemplary embodiment illustrated in FIG. 1, the compensation gap is produced by the axial height 4a of the cap 4, this gap may also be defined by a mechanical stop which is provided in the cap 4.

However, in the system described above, an air gap is to be avoided between the heating element support 1a and the pressure sensor 3, since otherwise knocking may occur between the two components. In order to prevent this, the heating element 1 is mechanically pre-tensioned in a direction toward the pressure sensor 3. The pre-tensioning force is sufficient to hold the heating element 1 while being so low that it does not or only immaterially influences the pressure signal.

Figure 2:
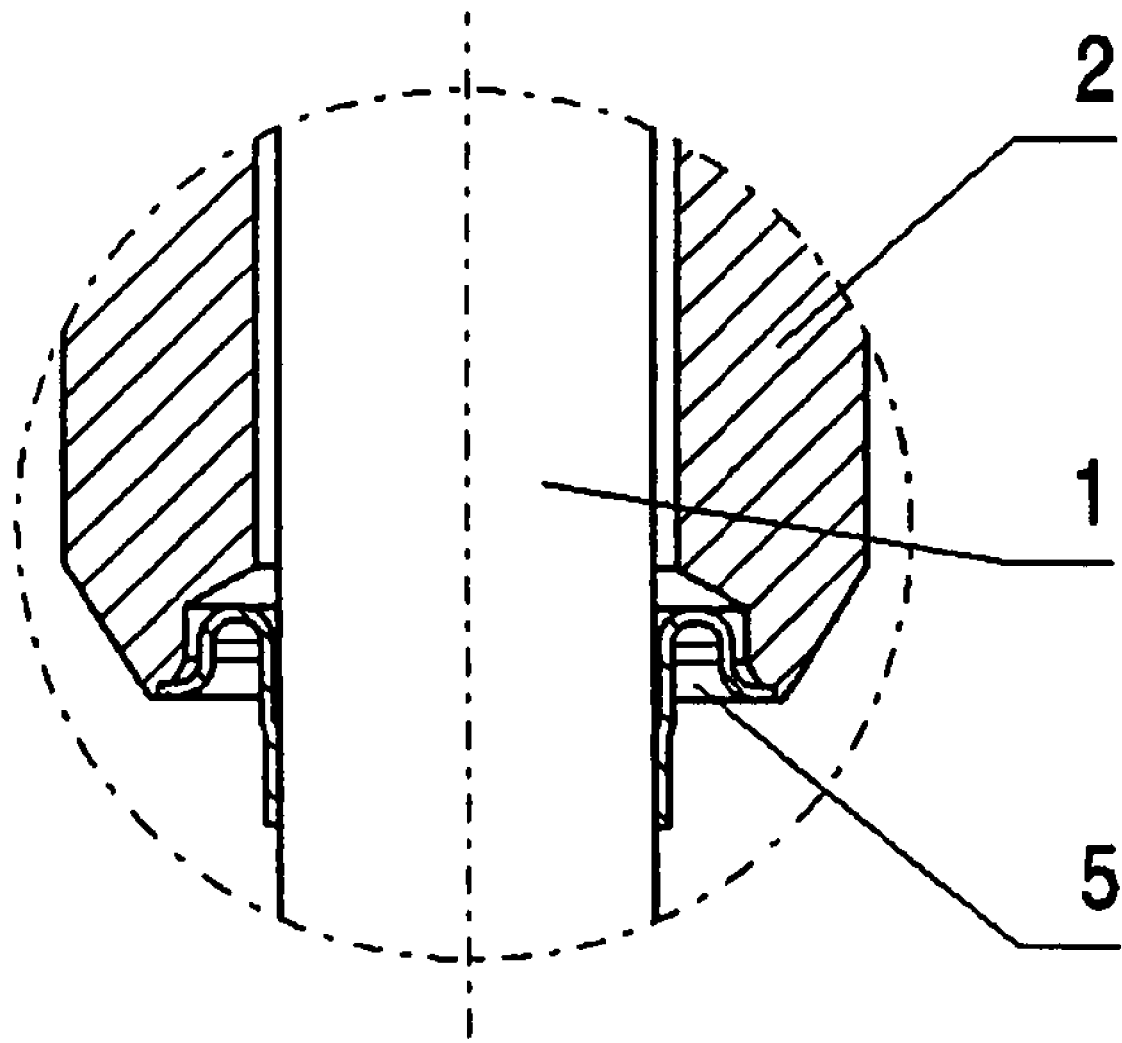

This pretension is generated by spring elements 5 which are positioned on the heating element 1, as is illustrated in the drawing. O-rings (FIG. 1), a membrane (FIG. 2), or an additional coiled springs come into consideration as spring elements.

Through this implementation, direct transmission of the pressure to the pressure sensor 3 is achieved, without damping elements positioned in between, which may in turn corrupt the pressure signal.

Since workpiece tolerances are automatically compensated for, the mechanical reproducibility is additionally significantly simplified.

Since a kind of floating mounting of the pressure sensor 3 is provided in the pressure gauge glow plug according to the present invention, different expansions because of different thermal expansion coefficients of the materials of the components and manufacturing tolerances may be compensated for without problems. The mechanical construction is thus significantly simpler and no noticeable pressure signal corruption occurs.

The pre-tension of the heating element 1 may be designed arbitrarily in this case through different types of spring elements and their design, no further components being required in addition to constructions typical up to this point.

What is claimed is:

1. A pressure gauge glow plug for a diesel engine, comprising:
    a plug body adapted for being inserted into a cylinder of a diesel engine,
    a heating element which is positioned in the plug body, and
    a pressure sensor which is positioned between the heating element in the plug body under pretension in such a way that the pressure sensor experiences the pressure existing in a combustion chamber of the cylinder as transmitted by the heating element, wherein
    the heating element is positioned in a manner enabling sliding displacement thereof in an axial direction in the plug body, and
    the pressure sensor is positioned on a heating element support that is rigidly bonded to the heating element within a cap that is rigidly bonded to the plug body in such a way that the heating element support and pressure sensor system comprise a system that has axial play within the cap.

2. The pressure gauge glow plug according to claim 1, wherein the heating element and the heating element support system is axially pre-tensioned against the pressure sensor.

3. The pressure gauge glow plug according to claim 2, wherein at least one spring element is positioned on the heating element for producing said pretension.

4. The pressure gauge glow plug according to claim 3, wherein the at least one spring element comprises an O-ring.

5. The pressure gauge glow plug according to claim 3, wherein the spring element is an elastic membrane.

6. The pressure gauge glow plug according to claim 3, wherein the spring element is a coil spring.

* * * * *